United States Patent [19]

Mahoney

[11] Patent Number: 4,955,231
[45] Date of Patent: Sep. 11, 1990

[54] LIQUID FLOAT GAGE ASSEMBLY

[75] Inventor: Christopher J. Mahoney, Birch Run, Mich.

[73] Assignee: General Motors Corporation, Detroit, Mich.

[21] Appl. No.: 351,105

[22] Filed: May 12, 1989

[51] Int. Cl.$^5$ ............................................. G01F 23/72
[52] U.S. Cl. ...................................... 73/313; 73/308; 200/84 C
[58] Field of Search ................ 73/308, 319; 200/84 C

[56] References Cited

U.S. PATENT DOCUMENTS

| | | | |
|---|---|---|---|
| 2,440,987 | 5/1948 | Thompson | 200/84 C |
| 2,590,680 | 3/1952 | Campbell | 200/84 C |
| 2,728,227 | 12/1955 | Eshbaugh | 73/319 |
| 3,224,270 | 12/1965 | Karol et al. | 73/313 X |
| 4,259,975 | 4/1981 | Kinsey Jr. | 73/313 |
| 4,695,796 | 9/1987 | Omet et al. | 73/314 X |

Primary Examiner—Daniel M. Yasich
Attorney, Agent, or Firm—Robert M. Sigler

[57] ABSTRACT

A liquid float gage assembly for a fluid reservoir includes magnet containing float in a vertical tube having an adjacent vertically spaced reed switch arrangement. The float is capsule shaped with an extended round cylindrical portion having rounded axial ends; and the magnet tends to be attracted to the closest reed switch to bias the float against the inner surface of the tube. The tube has a horizontally cross-sectional shape substantially matching and just larger than an axial section of the float so that the float has a stable floating orientation with a horizontal axis and is capable of rolling during vertical movement within the tube to reduce friction due to liquid surface tension between the float and the tube. The magnet has poles at axially opposing ends thereof within the float and a circumferentially consistent spacing relative to the outer surface of the float so as to provide a substantially non-varying magnetic field strength radially adjacent the float as the float rolls.

3 Claims, 1 Drawing Sheet

LIQUID FLOAT GAGE ASSEMBLY

BACKGROUND OF THE INVENTION

This invention relates to the measurement of liquid level within a fluid reservoir and especially to apparatus for such measurement of the type in which a float confined to vertical movement within a tube open to the reservoir incorporates a magnet to activate magnetic sensors such as reed switches in vertically spaced arrangement adjacent the tube.

In such apparatus, there is a tendency for the float to stick at a vertical location within the tube in spite of changing liquid level and give a false reading. This tendency is the sum of several factors, the first of which is the attraction of the magnet to the reed switch itself. A reed switch has a pair of magnetically responsive electrical contacts which potentially form part of a magnetic circuit if a magnetic field is introduced. The magnetic field, which may originate in a magnet moved adjacent the reed switch, magnetizes the electrical contacts to move into engagement and complete an electrical circuit. However, the magnet, being part of the magnetic circuit, is also attracted to the reed switch. This means, first of all, that some energy must be provided to the magnet to move it away from the reed switch to allow the contacts to open.

In addition, however, the float which contains the magnet is biased by this attraction against the inner surface of the tube wall adjacent the reed switches. This creates friction between the float and tube, due to liquid surface tension. This is particularly true for a float having a flat side against the tube; however, it will still be true to some extent with a rounded side, as long as the float must move vertically with a sliding motion against the side of the tube. This frictional force is added to the attraction of the magnet to the closest reed switch and helps deter the float from vertical movement as liquid level changes. The strongest force against vertical float movement is achieved when the magnet is horizontally adjacent and therefore closest to one of the reed switches with the reed switch contacts closed and the magnetic air gap thus minimal.

In addition to being confined to an essentially constant distance from the plane of the reed switches as it moves vertically, the float of such an apparatus must maintain the poles of the magnet in a substantially constant orientation relative to the reed switches so as to produce consistent magnetic characteristics over time and from one reed switch to the next. Thus the float itself must maintain a predictable orientation in spite of the forces produced by vehicle operation on the float itself and on the liquid.

SUMMARY OF THE INVENTION

The liquid level gage assembly of this invention substantially reduces the friction of the float in vertical movement over prior art float arrangements to reduce false readings due to float sticking while still maintaining a magnet in a predictable orientation and at a constant distance with respect to an arrangement of vertically spaced reed switches.

The invention comprises an improved liquid float gage assembly for a liquid reservoir of the type comprising a vertical tube open at the bottom for liquid communication with the reservoir so that the liquid level in the tube varies with that in the reservoir, a plurality of magnetically responsive sensors disposed in vertically spaced arrangement adjacent the tube and a float vertically movable within the tube to follow the liquid level therein, the float being capsule shaped with an extended round cylindrical portion having rounded axial ends and comprising a magnet sensed by the nearest of the magnetically responsive sensors and attracted thereby to bias the float against an inner surface of the tube adjacent the sensors. The improvement is characterized in that the tube has a horizontally cross-sectional shape substantially matching and just larger than an axial section of the float so that the float has a stable floating orientation with a horizontal axis and is capable of rolling against the inner surface of the tube adjacent the sensors with minimal friction during vertical movement within the tube due to changes in liquid level. The improvement is further characterized in that the magnet has poles at axially opposing ends thereof within the float and a circumferentially consistent spacing relative to the outer surface of the float so as to provide a substantially non-varying magnetic field strength radially adjacent the float as the float rotates about its axis.

Thus, the float is confined in a naturally stable horizontal position to maintain the magnet poles in a predictable orientation relative to the reed switches and is confined for vertical movement with minimal friction in response to changing liquid level by rolling against the side of the tube adjacent the reed switches. In addition, the magnetic characteristics of the magnet do not change as the float rolls. Further details and advantages of this invention will be apparent from the accompanying drawings and following description of a preferred embodiment.

SUMMARY OF THE INVENTION

DESCRIPTION OF THE PREFERRED EMBODIMENT

Figure 1:
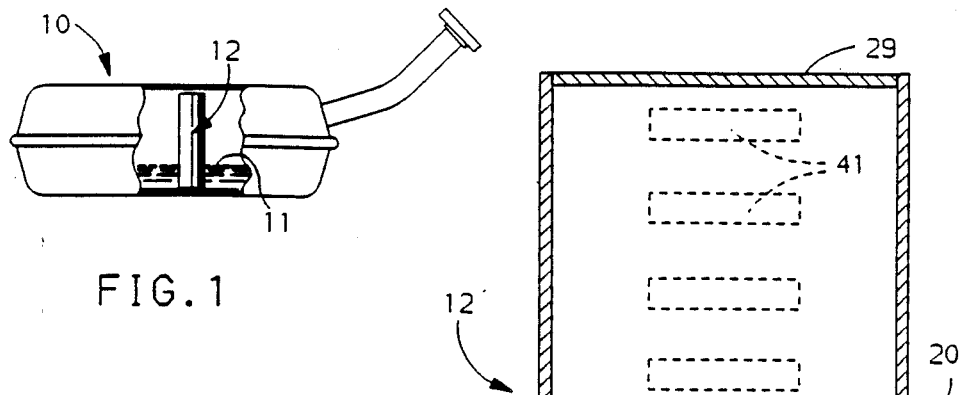
FIG. 1 shows a vehicle fuel tank partially cut away to show an internal fluid level gage assembly according to the invention.

Referring to FIG. 1, a vehicle fuel tank 10 comprises a liquid reservoir holding a variable amount of liquid fuel 11. The level of fuel within tank 10 varies as fuel is added to or removed from tank 10. In a predetermined location near the middle of tank 10, a liquid level gage assembly 12 is supported vertically within tank 10. Normally, liquid level gage assembly 12 is part of a total pump/gage package, suspended from the top of tank 10, which also includes an in-tank fuel pump and a fuel inlet. However, only the liquid level gage assembly is shown.

Figure 3:
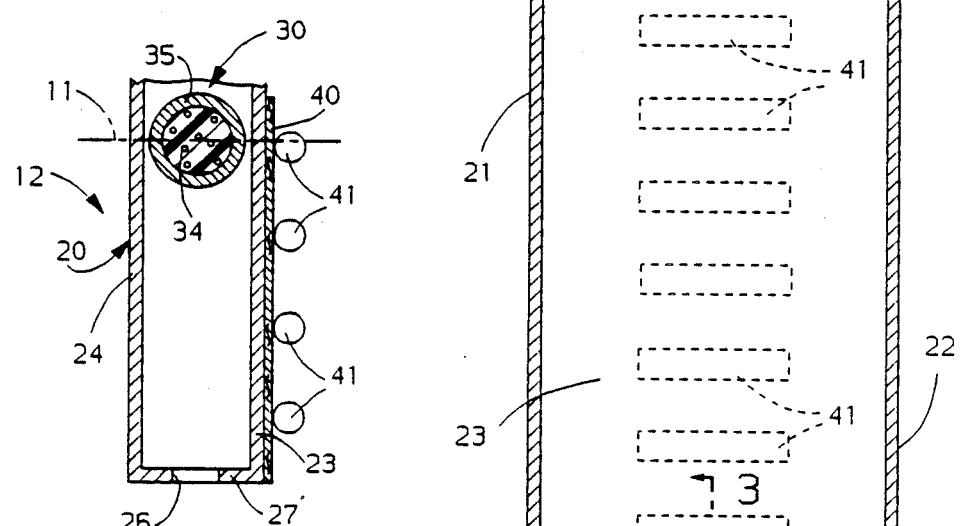
FIG. 3 shows a view along lines 3—3 in FIG. 2.
Figure 4:
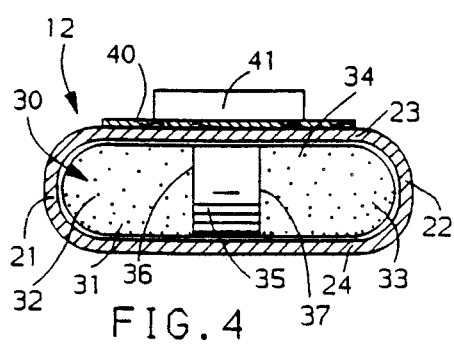
FIG. 4 shows a view along lines 4—4 in FIG. 2.
Figure 2:
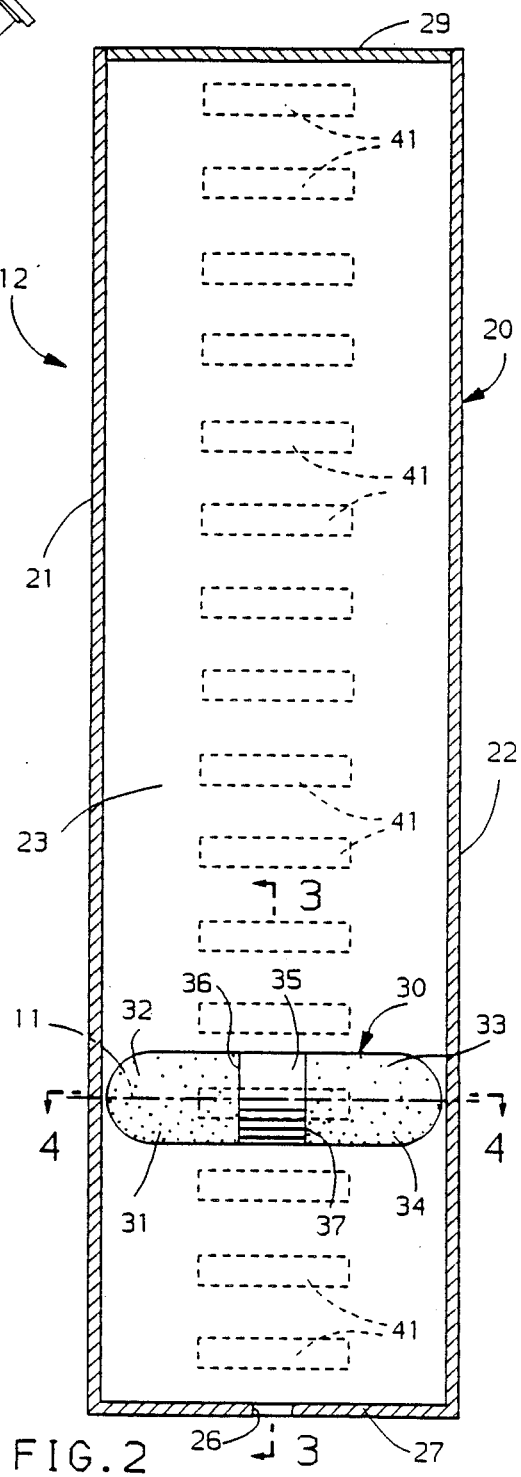
FIG. 2 shows an enlarged front cutaway view of a fluid level gage assembly as used in the fuel tank of FIG. 1.

Referring to FIG. 2, liquid level gage assembly 12 includes a vertical tube 20, made of a substantially non-magnetic material, being of about 15 cm height and having vertical side walls 21 and 22, a back wall 23 and, shown in FIGS. 3 and 4, a front wall 24. An opening 26 in a floor 27 of tube 20 provides damped liquid fuel communication between the interior of tube 20 and the remainder of tank 10. Openings, not shown, near the top 29 of tube 20, may be included to provide air communication so that the air and vapor pressure over the liquid fuel in tube 20 are essentially the same as those over the liquid fuel in tank 10 outside tube 20. Thus, the liquid level in tube 20 will be the same as that within tank 10 outside tube 20. The location of tube 20 is picked near the center of tank 10 to minimize variations due to fuel sloshing during vehicle accelerations or operation on sloping ground.

Tube 20 confines a float 30, which is capsule shaped with an axially extended round cylindrical portion 31 having rounded ends 32 and 33, which may be hemispherical. Float 30 has an axial length of about 4 cm and a radial diameter of about 1 cm. Float 30 comprises a major portion 34 made of a material such as nitrophenolic foam, which has a maximum specific gravity of 0.5 so as to float at the surface of a liquid fuel such as gasoline. However, it further includes an annular magnet 35 forming essentially the axial center of the outer surface of float 30 and being magnetized with north and south poles at opposite axial ends 36 and 37 thereof. Magnet 35 may be made of nylon 12 or PPS-bonded strontium ferrite and may have an axial length of 0.8 cm and an annular thickness of 0.1 cm. As can be seen in FIG. 4, the cross-sectional shape of tube 20 conforms to and is slightly larger than that of float 30, so that float 30 has a naturally stable orientation with a horizontal axis essentially at the liquid surface within tube 20. If float 30 is upended within tube 20 for any reason, it will fall back to this stable horizontal position. In the context of this stability, the rounded ends 32 and 33 of float 30 allow easier rotation back to the stable position. When the float is horizontal, the confining shape and size of tube 20 maintains float 20 in a predictable longitudinal and transverse position, as seen in FIG. 4, while allowing vertical movement and rotation to the stable position as necessary.

A circuit board 40 mounted adjacent and parallel to back wall 23 of tube 20 has mounted thereon a plurality of reed switches 41 in a vertically spaced arrangement. Reed switches 41 are oriented, such as horizontally, so as to form a magnetic circuit with magnet 35 when the latter is horizontally adjacent; and they are spaced vertically from each other so that only the closest is so activated. There are, for example, a minimum of 16 such reed switches 41 spaced apart by a maximum of ⅜ inch or 0.825 cm. The size and shape of tube 20 as well as the shape of float 30 and magnet orientation of magnet 35 therewithin provide a consistent relationship of magnet 35 to reed switches 41 as float 30 moves vertically and thus brings magnet 35 horizontally adjacent one or another of reed switches 41. The magnetic attraction of magnet 35 to the reed switches 41 provides a bias on float 30 against the inner surface of back wall 23 as well as a slight tendency to stay adjacent the reed switch which is currently closest. However, if the friction due to surface tension between float 30 and back wall 23 is small, the floating forces and/or weight of float 30 with magnet 35 will be sufficient to move float 30 up or down with the liquid surface.

Since float 30 presents a round cylindrical surface to back wall 23, it is able to roll on that surface. The minimal tangential contact and the rolling action provide for minimal friction due to surface tension as the float follows the changing liquid surface level; but the magnetic characteristics of the annular magnet do not change as the float rolls.

The embodiments of the invention in which an exclusive property or privilege is claimed are defined as follows:

1. In a liquid float gage assembly for a vehicle mounted liquid reservoir comprising a vertical tube open at the bottom for liquid communication with the reservoir so that the liquid level in the tube varies with that in the reservoir, a plurality of horizontally aligned magnetically responsive sensors disposed in vertically spaced arrangement adjacent the tube and a level therein, the float being capsule shaped with an extended round cylindrical portion having rounded axial ends and comprising a magnet sensed by the nearest of the magnetically responsive sensors and attracted thereto so as to bias the float to an inner surface of the tube adjacent the sensors, the improvement comprising:

the tube having a horizontally cross-sectional shape substantially matching and just larger than an axial section of the float so that the float has a stable floating orientation with a single horizontal axis and is capable of rolling against the inner surface of the tube adjacent the sensors with minimal friction during vertical movement within the tube due to changes in liquid level; and the magnet being annular about the axis of the float and having poles at axially opposing ends thereof and further having a circumferentially consistent spacing relative to the outer surface of the float so as to provide a substantially non-varying magnetic field strength and orientation relative to the horizontally aligned magnetically responsive sensors as the float rolls.

2. The liquid float gage assembly of claim 1 in which the magnetically responsive sensors are reed switches, each of the reed switches being closed by the magnet when the float is horizontally adjacent and forming a magnetic circuit with the magnet for an attractive force thereon.

3. The liquid float gage assembly of claim 1 in which the liquid reservoir is a vehicle fuel tank and the liquid is vehicle fuel.

* * * * *